Oct. 6, 1959
D. K. MOE
2,907,395
ELECTRIC POWER TOOL
Filed Jan. 27, 1955
2 Sheets-Sheet 1
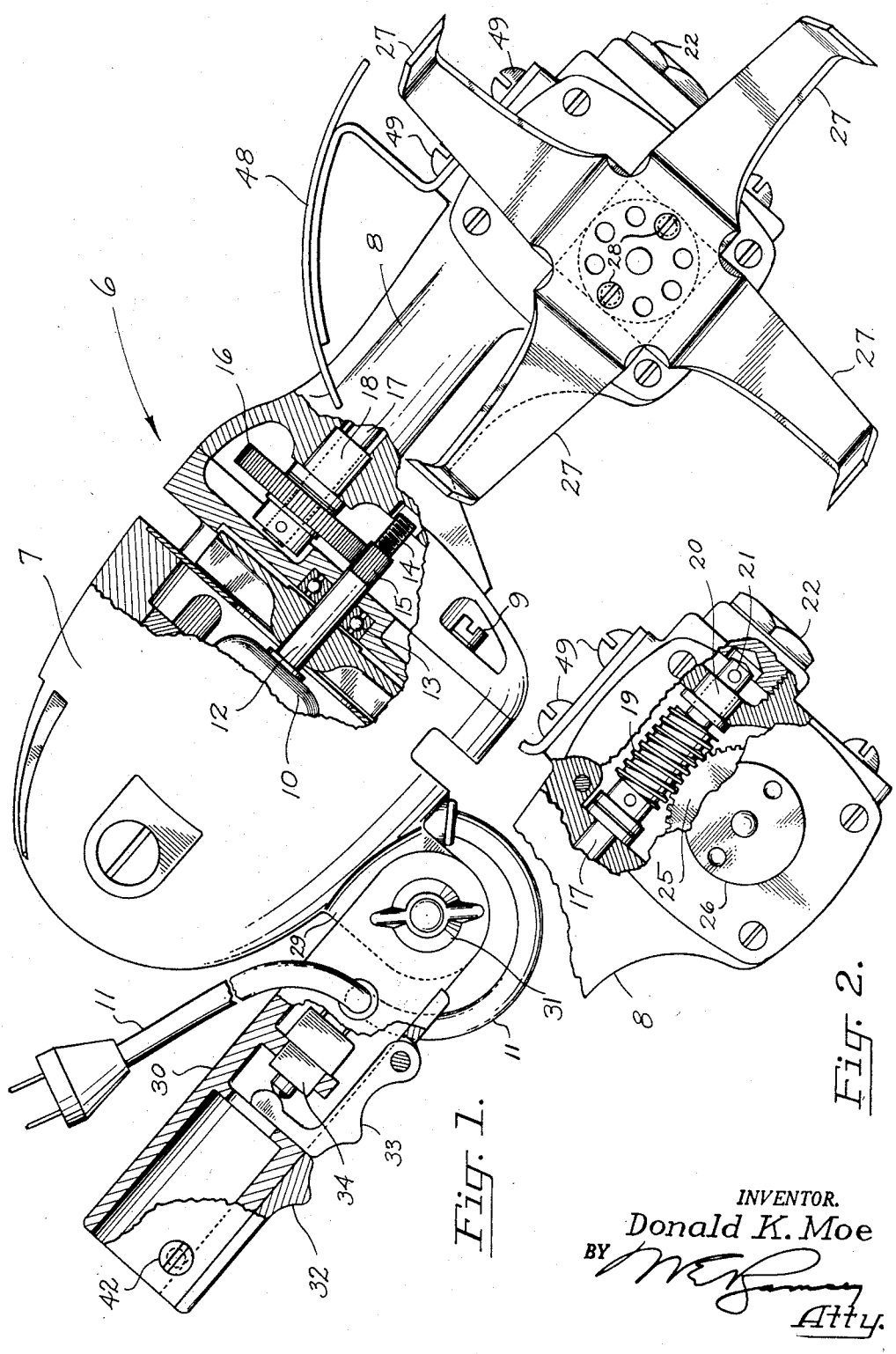
Fig. 1.
Fig. 2.
INVENTOR.
Donald K. Moe
BY
Atty.

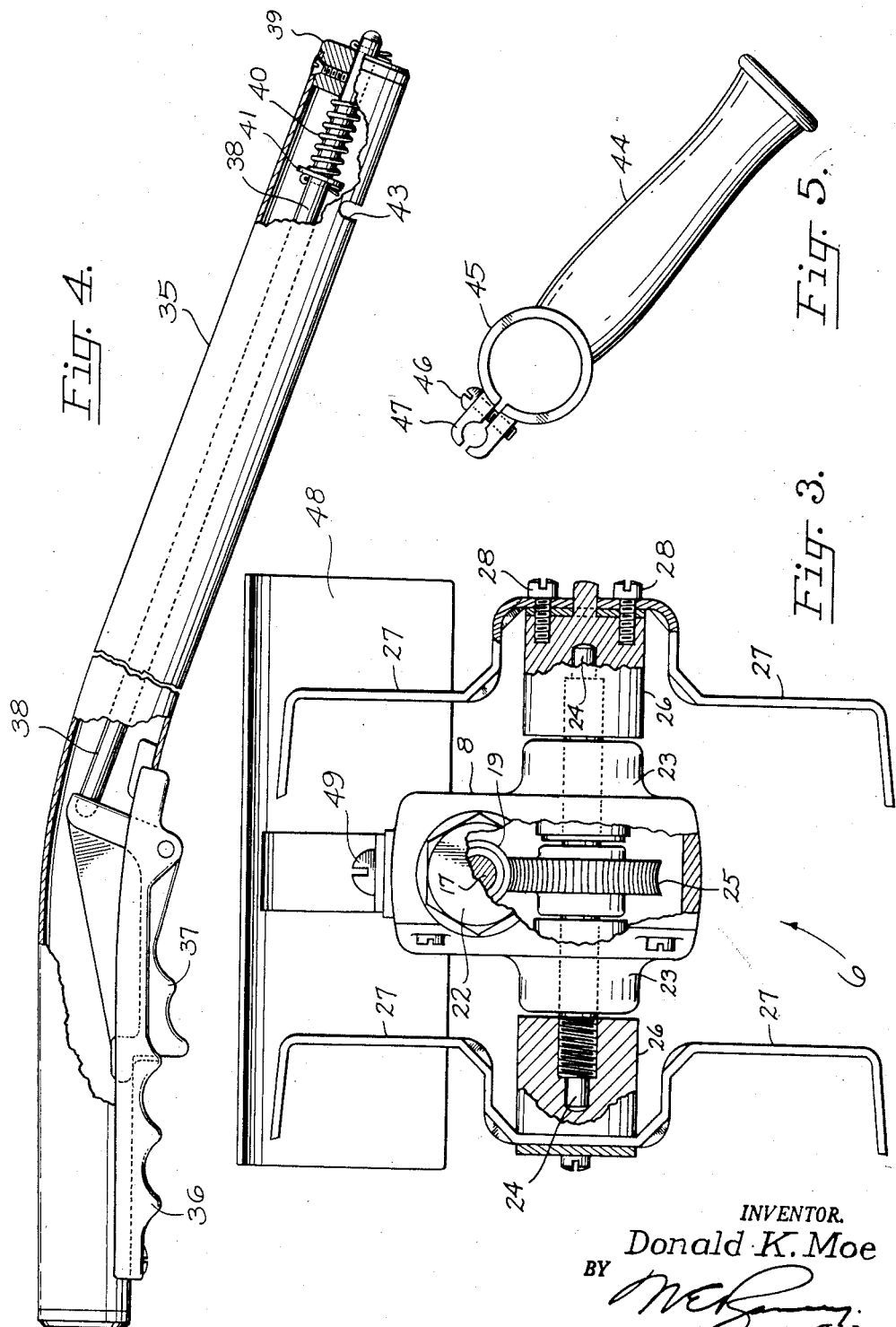

United States Patent Office 2,907,395
Patented Oct. 6, 1959

2,907,395

ELECTRIC POWER TOOL

Donald K. Moe, Portland, Oreg.

Application January 27, 1955, Serial No. 484,456

7 Claims. (Cl. 172—41)

This invention relates to a light weight electric power tool for home use with a variety of attachments either as a compact hand tool held directly in the hands or as a tool operable from an erect or standing position while employing a handle extension.

One object of my invention is to provide an inexpensive all purpose electric power tool having a gear train with selective coupling means for the connection of any of plural attachments operable at high, medium, or low rotational speeds.

A further object of my invention is to provide an all purpose yet a light weight electric power tool having particular utility as a portable garden tiller or cultivator by virtue of a concentration of a major portion of the mass or weight immediately adjacent the ground working tines or blades so the tool will take hold and cultivate efficiently even in packed or hard soil.

There are presently upon the market and coming into more popular use, a variety of low cost portable tillers, cultivators, ground working machines and the like adapted for home, garden, or green house use in the cultivation of soil. These range in size from the large, wheel supported walking tractors with gasoline engine power down to the small wheelless models with fractional horsepower electric motors and ground working blades which are the sole driving means. The instant invention is an inexpensive small tool of the latter type and easily is manipulable with one hand to mulch, weed, or otherwise to cultivate back yard gardens, borders, flower beds, green house seed beds, and other small plots, where conventionally, hand tools heretofore have been employed.

In experimenting with and in developing a small, compact power cultivator, I have found that several factors have an important bearing upon the provision and arrangement of the structural elements. First of all, if the tiller is to serve a mass market, it must be simple to operate and low in cost yet must be strong and capable of doing an effective job under all conditions commonly met with by the amateur gardener or householder. These factors plus the easy operating requirement demanded by women, dictate that the weight of the machine be kept to a minimum. At the same time, however, those skilled in the cultivation arts will recognize that a lack of weight can be a distinct disadvantage in a tiller. Where, for example, the machine encounters a clay, a compacted, or a crusted oversoil, the ground working blades or tines tend to skip over rather than bite into and thus cultivate the soil. Considering these seemingly incompatible weight factors together, I have determined that both can be served effectively by employing a novel structural arrangement of the operating parts in a light weight tiller. To this end, my tiller concentrates a major portion of the weight of the machine above and immediately adjacent the ground working blades or tines themselves and the operator thus performs no more than a guiding function.

It thus is one object of my invention to provide a light weight electric tiller in which the motor, housing, gearing, and tines or blades all are collected, concentrated, and arranged in a compact work head or base so as to bring to bear upon the blades or tines all available weight, and, coincidentally, so as to relieve the housewife or other worker using my tool of the necessity of herself supporting any considerable portion of this weight.

Another factor of substantial commercial importance in the marketing of a portable electric cultivator, is the attitude of the consumer or home owner who must purchase the machine. Thus, even though a light weight cultivator is of substantial help and is very efficient in cultivating gardens and flower beds and in relieving the amateur gardener of other tedious manual chores, the average person often feels that he cannot afford to invest his money in a specialized machine capable of but one function, namely cultivation. That is to say, the amount of cultivation accomplished by the average amateur or home gardener is limited and thus a tiller or cultivator per se is too specialized for practical use and purchase. For this and other reasons, I have provided with the instant invention a tool which is more than a mere cultivator. In fact, it is an all purpose tool, one use of which is in cultivation. Other uses, all provided by attachments, include a floor polisher, a rotary grinder, a lawn trimmer, an edger, a circular saw, and a hand drill. The provision of a tool which basically is a cultivator yet which, through attachments, will serve any of these other uses, is another object of the instant invention.

In brief summary, the work head or base of my power tool consists of a fractional horsepower electric motor which is mounted in a metal housing. This electric motor drives a stub shaft which terminates without the housing in separate threaded and geared portions selectively and respectively for operative connection with a high speed attachment or, through a medium speed gear reduction train, with a medium speed attachment. When used with other than a high speed attachment such as a trimmer, the geared portion of the stub shaft is meshed with an elongated gear train which reduces the speed about 8 to 1 and thus is termed a "medium" reduction gearing. This, in turn, terminates in a separate worm gear and joinder structure selectively and respectively for operative connection through a 10 to 1 or a slow speed gear train with a slow speed attachment such as a cultivator or directly with a medium speed attachment such as a rotary drill. In summary, a high speed attachment such as a rotary grass and weed trimmer can be secured directly to the threaded portion of the stub shaft itself, a drill arbor and chuck, a circular saw blade, or a grinding wheel can be connected to the medium or intermediate gear train, and a slow speed attachment such as a cultivator or power shears for edging lawns can be connected with the worm driven slow speed gear train. This provides an all purpose electric power tool having readily available in one work head three separate speed ratios. Other uses for such a tool will present themselves to one skilled in the art.

As another feature of my invention, the work head in which a major portion of the weight of the tool is concentrated coacts in novel manner with a light weight guide or handle structure. In detail, this handle structure includes a short handle member which detachably is joined by rotational adjustment structure directly to the work head and which carries a first hand grip and electric switch means for the control, manipulation, and operation of the device as a hand tool. When desired, an elongated handle extension member detachably is joined adjacent its lower end to the short handle member and is provided, adjacent its upper end, with a second hand grip and electric switch means for the control of the tool from an erect or standing position. Thus, when the tool is employed to cultivate seed beds in a green house, only the short or lower handle will be employed and the gardener thus is provided with what effectively is a power operated trowel, hoe, and shovel in combination. On the other hand, where the tool is used to cultivate a flower garden or to power a floor polisher or the like, the long handle extension is added so the operator may stand erect while guiding the tool. In this connection, it will be recalled that a major portion of the weight of the tool is concentrated within the base or head. Thus, when the handle extension is employed, the worker or gardener need not support the weight of either the electric motor or the gear trains but only need guide the tool somewhat as a housewife guides a vacuum cleaner. The provision of cooperating structure allowing the above useful result is an additional object of my invention.

Yet another object of my invention is to provide a work head for an electric power tool in which an electric motor drives a stub shaft which can be joined, selectively, to either a reduction train or a high speed attachment.

Still another object of my invention is to provide a handle structure having novel dual switch means for controlling an electric power tool whereby actuation of the tool can be effected from a point either closely adjacent or remote from the work head while utilizing but one pair of electric contacts.

In addition, it is an object of my invention to provide a portable electric garden tiller which is useful with a variety of attachments operable at a variety of speeds either as a compact hand tool or as a tool distantly operable from an erect or a standing position.

These and other objects and advantages of my invention will become apparent during consideration of the following detailed description, taken in conjunction with the accompanying drawings, wherein:

Fig. 1 is a side view of the work head portion of the tool with certain portions broken away and with the tines or blades attached for use in cultivation;

Fig. 2 is a detail view of the final worm drive with the housing broken open to reveal the joinder element by which a medium speed attachment may be connected;

Fig. 3 is a head on view with the ground working blades or tines in place and with portions of the housing and connecting structure broken away;

Fig. 4 is a foreshortened detail, partially broken away at each end, showing the handle extension together with the longitudinally movable rod which provides a distant actuation for the electric control switch; and Fig. 5 is a detail view of the gripping shaft which may be added for two hand manipulation of the tool and which serves, at the same time, to grip the electric cord through which power is supplied to the work head.

As an indication of actual size, Fig. 1 illustrates substantially full size the cast aluminum work head 6 as it appears in one commercial version of my tool. This work head includes a main housing member 7 and an auxiliary housing member 8 detachably joined one to another end to end as by threaded stud bolts 9. An electric motor 10 capable of an exemplary speed of 12,000 r.p.m. is mounted within the main housing 7 and power is provided via the electric cord 11, it being apparent that extension cords are added as they are required.

The rotor of the electric motor 11 is formed as a short stub shaft 12 (see Fig. 1), journal bearings being provided within the auxiliary housing 8 as indicated at 13. The stub shaft 12 thus rotates at the same speed as the rotor of the motor and, in fact, can be formed as an extension thereof to allow direct connection with a high speed attachment. To this end, the stub shaft 12 terminates in a threaded joinder means 14. When a high speed attachment such as a rotary trimmer is to be connected, the stub bolts 9 are removed, the auxiliary housing detached, and the attachment is threaded directly upon the section 14 as will be evident.

In order to accommodate a medium speed gear reduction train (preferably about 8 to 1), an intermediate section of the stub shaft 12 carries the teeth of a conventional small spur gear 15. A second larger spur gear 16 is keyed to an elongated shaft 17 which is journaled within the auxiliary housing as by a sleeve 18. The spur gears 15 and 16 are related as driver and driven gears so that operation of the electric motor 10 will cause the stub shaft to rotate at a high rate of speed to drive the larger gear 16 and the shaft 17 at an intermediate lower speed related as 12,000 to 1500 r.p.m. by way of example.

Turning now to Fig. 2, the shaft 17 is keyed to a worm drive 19, is journaled in a sleeve 20, and terminates with a threaded recess, knob or other joinder means 21. Thus, to operate an attachment at a medium speed, the plug or cap 22 is removed and the attachment connected directly to the joinder means 21 for operation at the exemplary speed of 1500 r.p.m.

Comparing Figs. 2 and 3, the auxiliary housing 8 carries an apertured shoulder 23 adjacent each side thereof. An elongated transverse shaft 24 spans this end of the auxiliary housing and is journaled within the apertures formed in the shoulders 23. In addition, it is this shaft 24 which carries the worm wheel 25 which meshes with the aforementioned worm drive 19. Operation of the worm drive and worm wheel, of course, effects yet another speed reduction whereby the shaft 24 is rotated at an even slower speed of 125 to 150 r.p.m. depending upon the load.

The connecting structure for the exemplary ground working blades or tines which are carried by the slow speed transverse shaft 24 best are shown in Fig. 3. To this end, a collar 26 is threaded upon each end of the shaft 24 with threads opposed to the rotational direction of the shaft in order that the collars will not come loose when the shaft is rotated during operation. The tines or blades 27 are made of hardened spring steel and are provided in pairs, one for each side of the tool. Each tine set is secured to a collar 26 by stud bolts 28 in order to provide a ready interchange of the parts. When the tool is employed as a ground cultivator, the width of the cut is adjusted by adding or removing pairs of tines to or from the collars or hubs 26. For example, with one tine on each side, a three and one half inch swath will be mulched. With a pair of tines on each side (see Fig. 1 for this example), a five and five eighths inch swath can be cultivated and with two pair of tines on each side, the width is a maximum of approximately ten and one half inches.

Returning now to Fig. 1, the main housing member 7 is provided with an integral protruding ear 29. This ear provides an attachment point for a short handle member 30 by employing a threaded bolt and wing nut assembly 31. The handle thus can be adjusted in rotation with respect to the work head 6 simply by backing off the wing nut assembly 31 and effecting the desired adjustment. In addition, the short handle 30 carries a hand grip portion 32 and a pivotal switch actuator 33. This switch actuator contacts an electric switch 34 to make or break the electric circuit through the electric cord 11 to the motor 10. For reasons of safety, I prefer to employ a so called dead man switch. Thus, the electric switch 34 is biased to the off or break circuit position and is moved to the on or make circuit position only with a positive conscious effort by pivoting the actuator 33 against the button on the end of the blade of the electric switch. Whenever the short handle 30 is not gripped tightly, the tool will be shut off and will not operate.

To provide for a distant operation of the tool from an erect or standing position, a handle extension is employed. This structure is shown in Fig. 4 and it includes an elongated hollow tubular member 35 formed of aluminum and having a hand grip portion 36 and a pivotal switch actuator 37 adjacent the upper end thereof. An elongated, longitudinally movable rod 38 extends the length of the tubular handle extension 35 with the upper end thereof mounted in a cup formed in the switch actuator 37 and with the lower end thereof guided in an aperture through a cap or ferrule 39. A compression spring 40 is caught intermediate the cap 39 and a collar 41 to bias both the rod 38 and the actuator 37 to a retracted or an off position. Comparing Figs. 1 and 4, it will be evident that the handle extension 35 fits within the upper end of the short handle member 30 with the cap 39 coming to rest so as to position the lower end of the rod 38 against the upper surface of the switch actuator 33. In this manner, depression of the actuator 37 serves simultaneously to depress the actuator 33 and close the switch to turn on the electric motor 10. Detachable engagement and joinder of the extension and handle 35 and 30 are provided by means of a threaded bolt 42 which fits within a lateral recess 43 to prevent relative rotation or longitudinal displacement of one member relative to the other.

Where it is desired that a grip be provided for each hand of the operator, the handle structure of Fig. 5 is employed. This handle structure includes a gripping shaft 44 having an integral ring 45 the inner diameter of which fits the outer diameter of the tubular handle extension 35. A threaded bolt 46 draws the split ring 45 tight about the handle extension. This structure is completed with a clip 47 which is adapted to grip an intermediate portion of an extension cord attached to the electric cord 11 and thus to hold the cord away from the work head 6 during operation. To secure the gripping shaft 44 in place, the ring 45 is slipped over the tubular handle extension 35 and is adjusted in proper position to protrude laterally therefrom. Thereinafter, the threaded bolt 46 is tightened with the section of electric extension cord in place between the jaws of the clip 47. By locating this structure to either side of the handle extension 35, provision can be made for either a right or a left handed person to operate the power tool easily and in a natural manner.

In use, the power tool is adapted to receive a variety of attachments and is useful either as a compact hand tool or as a tool distantly operable from an erect or standing position while employing the handle extension of Figs. 4 and 5. For example, with the tines or blades 27 and auxiliary housing 8 attached, the tool is a powerful, compact garden tiller with which small areas or plots and hard to reach locations can be cultivated. During such use, I prefer to employ a guard or shield 48 which detachably is connected to the upper portion of the auxiliary housing 8 by means of bolts 49. After plugging the electric cord 11 into an extension cord outlet and the extension into an electric outlet, the tool is ready for use. From a standing or erect position, depression of the actuator member 37 by the operator will move the rod 38 longitudinally to make or close the electric switch 34 and energize the electric motor 10. This rotates the stud shaft, spur gears, worm gears, and tines 27 as will be evident. For a shallow tilling, the operator allows the tool to creep forward slowly and smoothly with the tines or blades 27 rotating at a speed of approximately 125 r.p.m. To till or to cultivate to a greater depth, the operator holds back slightly upon the handle extension slowing down the forward progress of the tool and thereby allowing it to dig deeper. Where the ground is dry and hard, it is recommended that it be dampened slightly before cultivation. This softens the soil and makes it much easier to work. However, caution should be observed to avoid excess moisture creating a mud condition since, of course, tilling muddy soil accomplishes little good. With a little practice, the average home owner or housewife can till within inches of flowers or the like without danger of damage to the fragile and sometimes valuable growing plants. Frequent cultivation with the tool makes hand weeding unnecessary since the job done with this power cultivator is more thorough and more uniform than is possible with previous hand methods. At times, it may be necessary to remove grass or weeds from the tines or blades 27 as the cultivation progresses. In this event, it is suggested that the electric cord 11 be disconnected entirely before the grass or weeds are removed in order to prevent an accidental start of the motor.

In the commercial embodiment of my invention, the electric motor 10 is a series wound A.C. motor operable from a conventional house circuit at 115 volts. This motor draws between 1.9 and 5 amperes thereby developing between one sixth and one quarter horsepower depending upon the load. In operation, the electric motor 10 causes the stub shaft 12 to rotate at a speed of approximately 12,000 r.p.m. By providing the correct number of teeth on the gears 15 and 16, the shaft 17 and joinder means 21 will be caused to rotate at 1500 r.p.m. After traversing the worm reduction gearing 19, 25, the speed of the shaft 24 and tines 27 then will be between 150 and 125 r.p.m. again depending upon the load. These exemplary specifications point up the adaptability of the tool to receive a variety of attachments each operable at a different speed.

Several exemplary attachments will be described. One of these is an edger or power shears for edging lawns about the base of trees, along the driveway, etc. Such an edger operates at a low speed and thus is attached in place of the tines 27 to operate from the shaft 24 at a speed of approximately 125 r.p.m. A second attachment may be a drill chuck, a circular saw and arbor, or a grinding wheel. These three attachments preferably operate at about 1500 r.p.m. Accordingly, they are attached to the work head or base by first removing the plug 22 and thereinafter by connecting the attachment to the joinder section 21 on the end of the shaft 17. With the drill chuck, for example, the handle extension structure of Figs. 4 and 5 need not be employed. Instead, the short handle 30 is gripped with one hand while the other hand steadies the drill by grasping the housing 8 to the rear of the rotating chuck. Pivotal depression of the actuator 33 then will close the electric switch 34 causing the drill chuck to rotate at the aforementioned 1500 r.p.m.

Another attachment which is operable with the same basic power tool is a rotary floor polisher. This floor polisher best is provided with a built in reduction gearing to reduce the speed of the polishing head to approximately 600 r.p.m. after a take off from the joinder means 21. Utilizing this particular attachment, of course, wheels can be added to the work head and the handle extension structures of Figs. 4 and 5 then are employed so that the housewife may stand erect while operating the polisher.

As a final example of an attachment readily operable from my power tool, a rotary trimmer for grass and weeds may be secured directly to the threaded section 14 and the stub shaft 12 and wheels added to the work head. This rotary trimmer then will operate at a speed of approximately 12,000 r.p.m. to trim small areas of grass and weeds in much the same manner as does a rotary power mower or the like.

In summary, it will be seen that a major portion of the mass or weight of the power tool is concentrated in the work head 6 adjacent the cultivator or other attachment which is accomplishing the work. With this preferred weight or mass concentration, the operator need support but a small portion of the weight with the handle extension 35 and, in fact, need exercise little more than a guide function. This not only accomplishes the particular polishing, trimming, or cultivating work with more efficiency but also is saving of the energies of the home owner or housewife employing my power tool. Further, it now will be appreciated that my power tool is practical in an economic sense since it is much more than a specialized cultivator and, in fact, is an inexpensive all purpose tool of use with a variety of attachments about the average home and yard.

I claim:

1. An article of manufacture, comprising an electric motor mounted in an elongated yet a compact hollow metal housing defining a work head, a short stub shaft driven directly from said electric motor and journaled within one end of said housing, said stub shaft extending without said housing one end and terminating in separate threaded connection means and spur gear means, an elongated medium speed gear train means operatively meshing adjacent one end of said stub shaft spur gear means and terminating adjacent the opposite end in separate worm gear means and attachment joinder means, a short handle member joined by pivotal adjustment structure to said work head and carrying first hand grip and switch means for the control, manipulation and operation of the device as a compact hand tool, and an elongated handle extension member detachably joined adjacent a lower end to said short handle member and carrying adjacent an upper end second hand grip and switch means for the control, manipulation and operation of the tool from an erect position.

2. An article of manufacture, comprising an electric power tool adapted to receive a variety of attachments and useful either as a compact hand tool or as a tool distantly operable from an erect or standing position while employing a handle extension, said tool including a fractional horsepower electric motor and housing defining a work head in which is concentrated a major portion of the weight of the tool, stub shaft means driven directly from said electric motor and journaled within one end of said housing, said stub shaft extending without said housing one end and terminating in means selectively for operative connection directly with a high speed attachment or, by a medium speed gear reduction train, with a medium speed attachment, an elongated medium speed gear reduction train means operatively meshing adjacent one end with said stub shaft means and terminating adjacent the opposite end in means selectively for operative connection, by a slow speed gear train, with a slow speed attachment or directly with a medium speed attachment, first handle means joined to said work head and carrying first hand grip and switch means for the control, manipulation and operation of the device as a hand tool, and second handle means detachably joined adjacent a lower end to said first handle and carrying adjacent an upper end second hand grip and switch means for the control, manipulation and operation of the tool from an erect position, both of said handle means being hollow tubular members together housing longitudinally movable means interconnecting said first and second switch means selectively to effect a control of the operation of the tool with either of said switch means.

3. An article of manufacture, comprising an inexpensive light weight electric power tool adapted to operate a variety of attachments at any of three rotational speeds, said tool including an elongated hollow work head having a main housing member and an auxiliary housing member detachably joined to one another end to end, an electric motor mounted within said main housing and having a stub drive shaft extending into said auxiliary housing, said stub shaft terminating in threaded joinder means for selective connection directly with a high speed attachment, an intermediate section of said stub shaft carrying driver spur gear means operatively but detachably meshed with driven spur gear means journaled within said auxiliary housing, and an elongated rotatable shaft operatively carrying said driven spur gear adjacent one end and also carrying both a drive and a joinder means for selective connection directly with a medium speed attachment adjacent the other end.

4. In an electric power tool adapted to operate a variety of attachments including a cultivator, an elongated hollow work head having a main housing member and an auxiliary housing member detachably joined to one another end to end, a fractional horsepower electric motor mounted within said main housing and having a stub drive shaft extending into said auxiliary housing, said stub shaft terminating in joinder means for selective connection directly with a high speed attachment, an intermediate section of said stub shaft carrying driver spur gear means operatively but detachably meshed with driven spur gear means journaled within said auxiliary housing, said driver spur gear being formed directly upon said stub shaft and having fewer teeth than said driven spur gear to effect a speed reduction, an elongated rotatable shaft extending the length of said auxiliary housing and operatively carrying said driven spur gear adjacent one end and both a worm drive and joinder means for selective connection directly with a medium speed attachment adjacent the other end, and worm wheel means operatively but detachably meshed with said worm drive within said auxiliary housing for selective operative connection with a low speed attachment.

5. A portable electric garden tiller, comprising an elongated gear reduction train and an electric motor drive therefor both mounted within an elongated hollow housing to define a compact work head base in which is concentrated a major portion of the weight of the entire device, said housing and gear train both being detachable selectively to engage various portions of the gear train with various attachments, elongated handle means having a lower end secured to said work head and an upper end carrying means for the distant control, manipulation and operation of the work head from an erect position, said handle including a hollow tubular member having an electric switch adjacent the lower end thereof operatively joined with a switch actuator and hand grip adjacent the upper end thereof, and a gripping shaft adjustably and detachably protruding laterally from said tubular member upper end, said electric motor having a power supply cord which lies along the outside of said tubular member and detachably is retained in place by clip means carried by said gripping shaft.

6. In a portable electric garden tiller, a gear reduction train and a fractional horsepower electric motor drive therefor both mounted within an elongated hollow housing to define a compact work head in which is concentrated a major portion of the weight of the entire device, plural rotatable ground engaging and tilling elements mounted without one end of said housing in detachable operative driven connection with the corresponding end of said gear train and defining the sole driving and support means for said work head, said housing and gear train both being cooperatively detachable at plural points along the lengths thereof selectively to engage various portions of the gear train with various attachments operable at various rotational speeds, elongated handle means having a lower end secured with pivotal adjustment structure to said work head and an upper end carrying means for the distant control, manipulation and operation of the work head from an erect position, said handle including a hollow tubular member having an electric switch adjacent the lower end thereof operatively joined with a switch actuator and hand grip adjacent the upper end thereof, and a gripping shaft adjustably and detachably protruding laterally from said tubular member upper end, said electric motor having a power supply cord which lies along the outside of said tubular member and detachably is retained in place by clip means carried by said gripping shaft.

7. An electric powered ground working tool having an elongated handle with a control at one end and a work head at the other, an electric motor mounted in said work head, the major portion of the weight of said tool being concentrated in said head, a rotor shaft for said motor, said rotor shaft extending away from said handle and journaled within said work head, and plural means, operatively joined to said rotor shaft, selectively engageable from within said work head and constituting a high speed tool attachment and a lower speed tool attachment, respectively, said elongated handle comprising two separable sections, one a short one secured to said work head and carrying means for the control, manipulation and operation of said motor, and a longer section detachably securable to the shorter section, said longer section having manipulatable control elements housed therein for actuating the control means in the shorter section.

References Cited in the file of this patent

UNITED STATES PATENTS

| | | |
|---|---|---|
| 1,569,987 | Lamberti | Jan. 19, 1926 |
| 1,660,764 | Pidlisny | Feb. 28, 1928 |
| 2,119,962 | Raleigh | Jan. 7, 1938 |
| 2,417,620 | Soderberg | Mar. 18, 1947 |
| 2,458,200 | Renfroe et al. | Jan. 4, 1949 |
| 2,550,590 | Parmilleux | Apr. 24, 1951 |
| 2,625,867 | Hands | Jan. 20, 1953 |
| 2,699,605 | Setter | Jan. 18, 1955 |
| 2,805,611 | Fletchall | Sept. 10, 1957 |
| 2,816,495 | Brooks | Dec. 17, 1957 |
| 2,823,597 | Kelsey | Feb. 18, 1958 |